US012000190B2

(12) United States Patent
Dries et al.

(10) Patent No.: US 12,000,190 B2

(45) Date of Patent: Jun. 4, 2024

(54) CLOSURE DEVICE AND SELF-CLOSING PIVOT HINGE

(71) Applicant: PORTAPIVOT BV, Massenhoven (BE)

(72) Inventors: Koen Dries, Zoersel (BE); Rudi Dries, Gravenwezel (BE)

(73) Assignee: PORTAPIVOT BV, Massenhoven (BE)

( * ) Notice: Subject to any disclaimer, the term of this patent is extended or adjusted under 35 U.S.C. 154(b) by 68 days.

(21) Appl. No.: 17/778,848

(22) PCT Filed: Oct. 13, 2020

(86) PCT No.: PCT/IB2020/059594

§ 371 (c)(1),
(2) Date: May 22, 2022

(87) PCT Pub. No.: WO2021/099857

PCT Pub. Date: May 27, 2021

(65) Prior Publication Data

US 2023/0349215 A1 Nov. 2, 2023

(30) Foreign Application Priority Data

Nov. 22, 2019 (BE) .................................. 2019/5821

(51) Int. Cl.

*E06B 3/02* (2006.01)
*E05F 1/12* (2006.01)
*E05F 3/20* (2006.01)

(52) U.S. Cl.

CPC .............. *E05F 1/1292* (2013.01); *E05F 3/20* (2013.01); *E05Y 2201/638* (2013.01); *E05Y 2900/132* (2013.01)

(58) Field of Classification Search

CPC ...... E05F 1/292; E05F 3/20; E05Y 2201/638; E05Y 2900/132

USPC .................................................... 49/399, 388

See application file for complete search history.

(56) References Cited

U.S. PATENT DOCUMENTS 5,867,869 A 2/1999 Garrett et al.
2015/0368951 A1 12/2015 Wang et al.
2023/0203868 A1* 6/2023 Principe ................ E05B 47/023 49/388

FOREIGN PATENT DOCUMENTS

DE 10 2011 001626 A1 10/2012
KR 102177949 B1 * 11/2020
KR 20210007388 A * 1/2021
KR 20220028617 A * 3/2022

(Continued)

OTHER PUBLICATIONS

International Search Report issued in PCT/IB2020/059594, dated Feb. 1, 2021.

*Primary Examiner* — Jerry E Redman

(74) *Attorney, Agent, or Firm* — Locke Lord LLP; Michael J. Pollack; Scott D. Wofsy

(57) ABSTRACT

Self-closing pivot hinges and devices such as doors for closing off an opening between two rooms or in a building façade using such hinges include a spring that extends into a hinge housing along the longitudinal direction of the hinge housing, which lends a self-closing function, and a cam element and a ball that is pressed against the cam element by the spring. The cam element is shaped so that it creates support positions in which the ball rests.

20 Claims, 10 Drawing Sheets

(56) References Cited

FOREIGN PATENT DOCUMENTS

| | | | | |
|---|---|---|---|---|
| WO | 2016/042525 A1 | | 3/2016 | |
| WO | WO-2021099857 A1 | * | 5/2021 | ........... E05D 11/105 |

* cited by examiner

CLOSURE DEVICE AND SELF-CLOSING PIVOT HINGE

CROSS-REFERENCE TO RELATED APPLICATION

This is a U.S. National Phase Application filed under 35 U.S.C. § 371, based on International PCT Patent Application No. PCT/IB2020/059594, filed Oct. 13, 2020, which claims priority to Belgian Patent Application No. 2019/5821, filed on Nov. 22, 2019. The entire content of these applications is incorporated herein by reference.

The current invention involves a device, in particular an interior or exterior door, for closing off an opening between two rooms or a façade opening that is equipped with a self-closing pivot hinge. The current invention also involves a self-closing pivot hinge to be attached onto or in a door leaf, in particular the door leaf of an interior or exterior door, to be mounted in a wall or façade opening.

STATE OF THE ART OF TECHNOLOGY

The self-closing pivot hinges known from the state of the art of technology are at least partially attached in a recess provided for this in one of the sides of the door leaf of the door. The self-closing pivot hinges contain a rotation column provided to be attached to the wall of the door opening opposite the relevant side of the door leaf into which the pivot hinge is integrated, wherein the housing is attached to rotate around the rotation column such that the housing is rotatable around the rotation column of a closed position, in which the door leaf closes the door opening, in a first direction to a first open position and/or in a second direction opposite to the first direction, to a second open position. The self-closing pivot hinges also have a spring that has a self-closing function for the pivot hinge.

A spherical ball is pressed against a cam element by the spring, which makes up part of the rotation column. The cam element is thus shaped so that it creates support positions in which the ball rests when the door leaf is in the open and closed positions, and that the ball is under the influence of the spring pressure of the spring, different from nearly from every position, is pressed in the direction of the support position that coincides with the closed position of the door leaf.

Such pivot hinges are also known from WO 2016/042525 A1 and WO 2018/203213 A1.

OBJECTIVE OF THE INVENTION

The objective of the current invention is to provide a more compact version of this type of self-closing pivot hinge, in particular a self-closing pivot hinge with a relatively small installation height (e.g. maximum 40 mm), preferably an installation height of 33 mm, which can still develop a relatively great force (e.g. minimum 400 N) and which has a dampened closure.

DESCRIPTION OF THE INVENTION

The invention provides for a self-closing pivot hinge that is installed in the recess of the cam element which is consistent with the closed position of the plate element, a damping element is included for the support of the first spherical ball in the recess so that, when the first ball is pushed under the influence of the spring force of the first spring, it is pushed in the direction of the support position consistent with the closed position of the plate element (such as a door leaf), the damping element is deformed by the first ball and the first ball is slowed. In other words, the damping element is provided to dampen the movement of the first ball, under the influence of the spring force of the first spring, in the direction of the support position that is consistent with the closed position of the plate element.

The self-closing pivot hinge according to the current invention has the advantage that the closing of the pivot hinge is slowed but not hindered by the presence of the damping element. In addition, including the damping element in the cam element has the advantage that the pivot hinge can be very compact because the damping mechanisms are provided in an existing element. In addition, including the damping element in the recess of the cam element that is consistent with the closed position, has the advantage that the movement of the pivot hinge to the closed position is curbed relatively late and the pivot hinge thus reaches the closed position relatively quickly. In addition, through the presence of the damping element one avoids the plate element (e.g. door leaf) slamming shut or oscillating when reaching the closed position, meaning is moved one or more times past the closed position.

In another design according to the invention, the damping element is made of a solid state material. This in contrast to elements made of a liquid or a liquid containing solid state materials that determine the flow characteristics (sometimes also called quasi-solid, semi-solid or semi-liquid), such as oil or lubricant.

In a design according to the invention, the damping element contains a convex surface that is found within the recess of the cam element.

In another design according to the invention, the damping element is made of an elastically formable material, such as elastomer, rubber, flexible elastomeric foams (FEF) or a combination of these. Preferably, an elastically formable damping element in an unformed state has at least one recess for receiving part of the elastic formable damping element in the forming of the elastically formable damping element. A further preference is that the elastic formable damping element contains an elongated opening through the damping elements.

In yet another design according to the invention, the damping element is formed by a spring shaped damping element. In designs according to the invention, the cam element can be made of two cam sections with snap-lock fasteners consisting of a protruding snap profile and a complimentary recess for the cam sections being locked together. Preferably, the cam element contains arched recesses on opposite sides of the snap-lock elements for receiving a spring shaped damping element.

In designs according to the invention, the first spring is in a pre-loaded position when the plate element is in the closed position, wherein the pre-loading should be at least 25% and preferably at least 50%, and even more preferably at least 75% of the total compressibility of the spring device.

In another aspect according to the invention, whether or not in combination with the other aspects described here, the first pivot hinge contains a second spring that extends in the housing along the length of the housing, and wherein the first and second springs are on opposite sides of the rotation column, and a second spherical ball that is pressed against the cam element by the second spring, and wherein the cam element is then further formed so that the support positions are created in which the second ball rests when the door leaf is in the open and close positions, and that the second ball is under the influence of the spring force of the second spring in nearly every position, and is pushed in the direction of the support positions consistent with the closed position of the door leaf, different from the support positions.

Another aspect according to the invention, whether or not in combination with the other aspects described here, involves a pivot hinge as previously described. Another aspect according to the invention, whether or not in combination with the other aspects described here, involves a pivot hinge as previously described.

SUMMARY DESCRIPTION OF THE FIGURES

The invention will be explained in more detail using a design shown in the figure.

Figure 5:
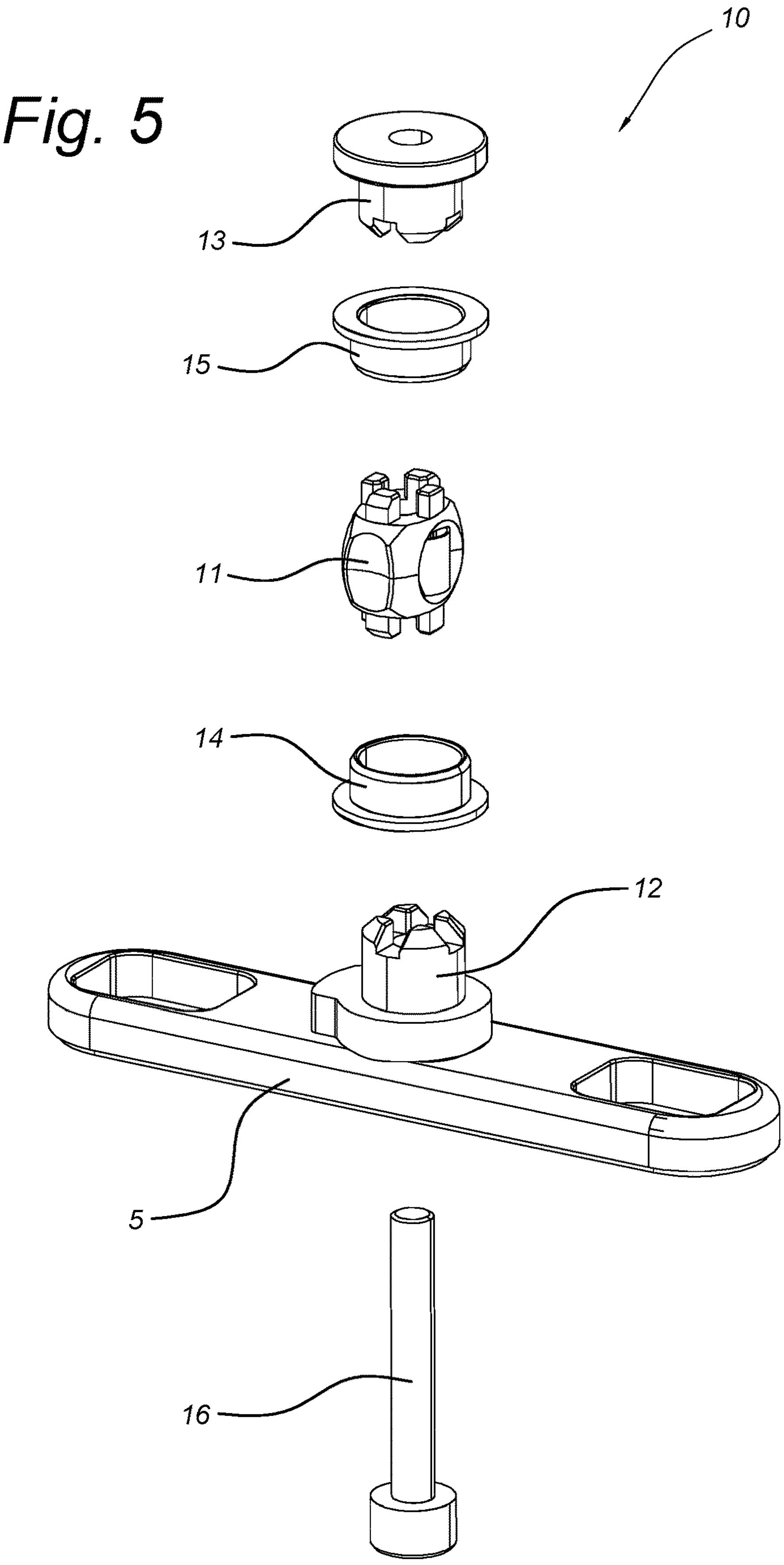
FIG. 5 shows an open view of a section of a pivot hinge of a door device according to one design of the current invention.
Figure 6A:
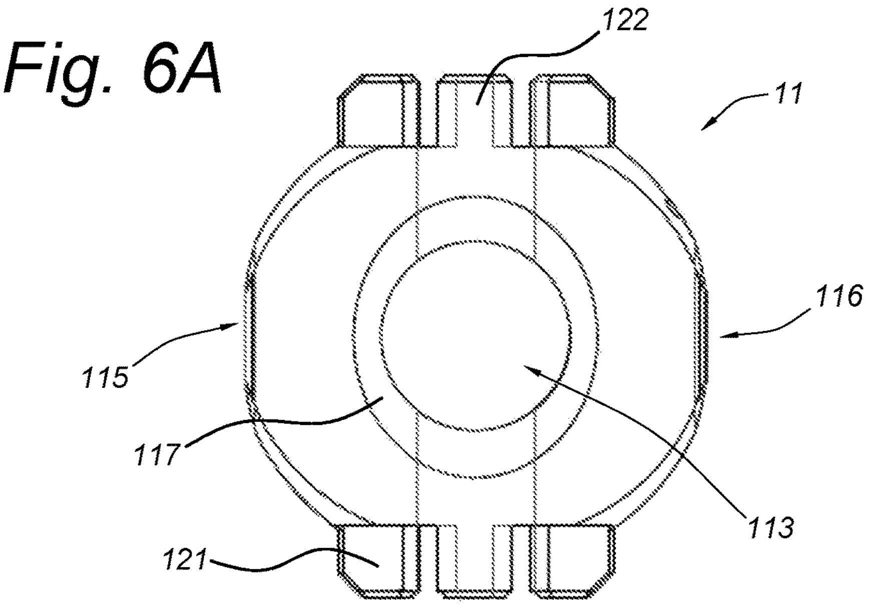
Figure 6B:
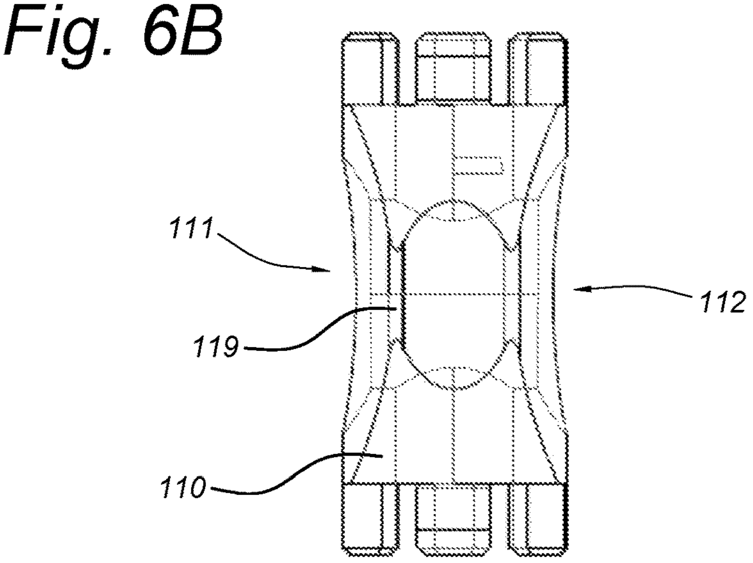
Figure 6C:
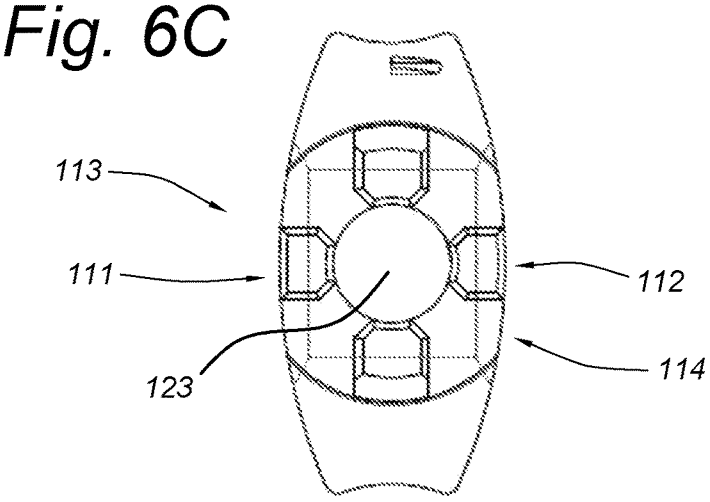

FIGS. 6A-C show respectively a front view, a side view and a top view of the cam element of a pivot hinge shown in FIG. 5.

Figure 7A:
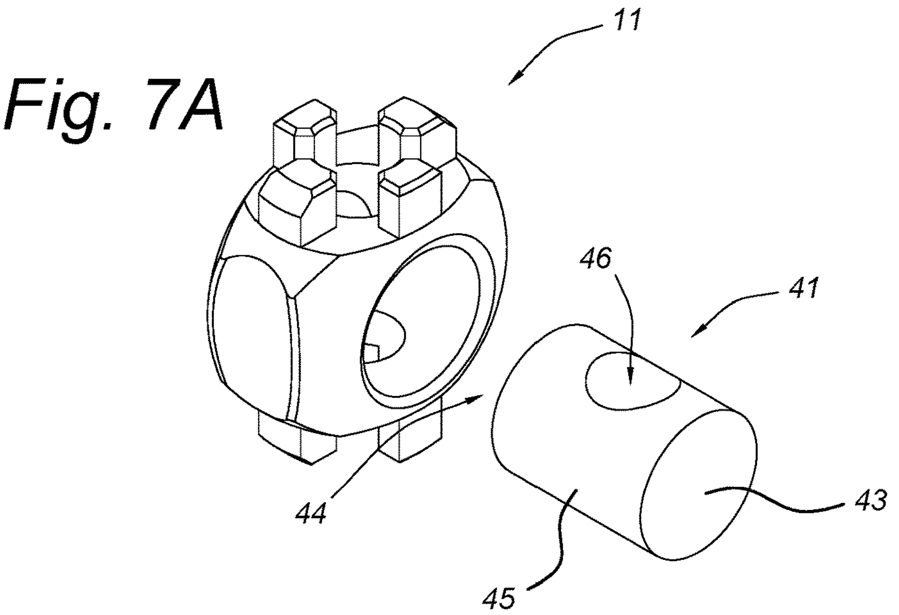
Figure 7B:
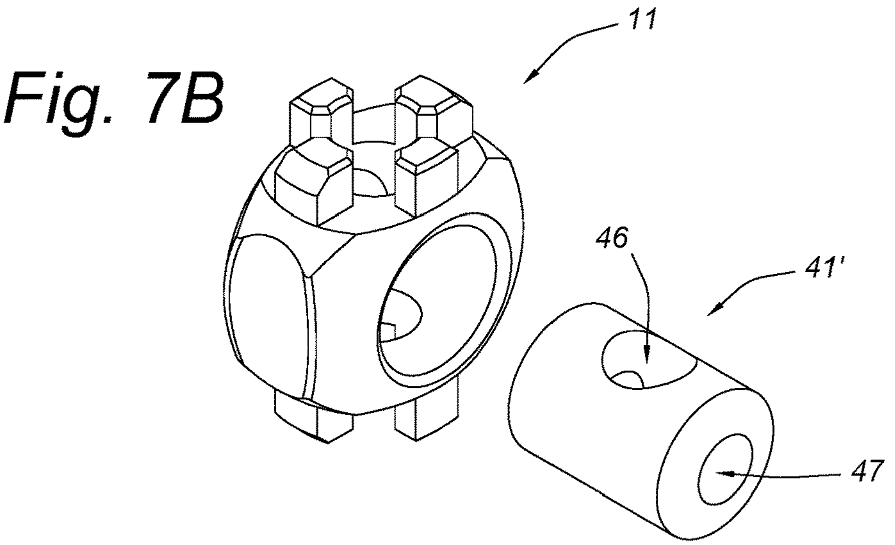
Figure 7C:
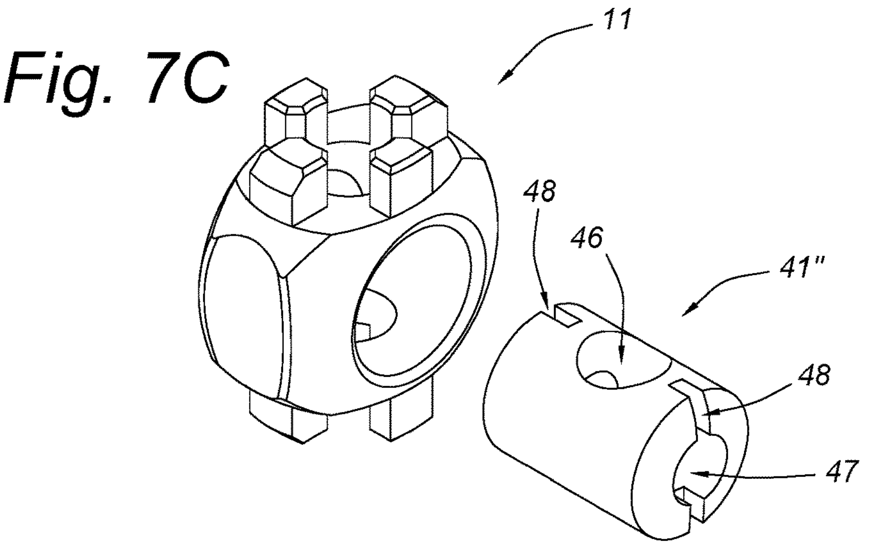
Figure 8:
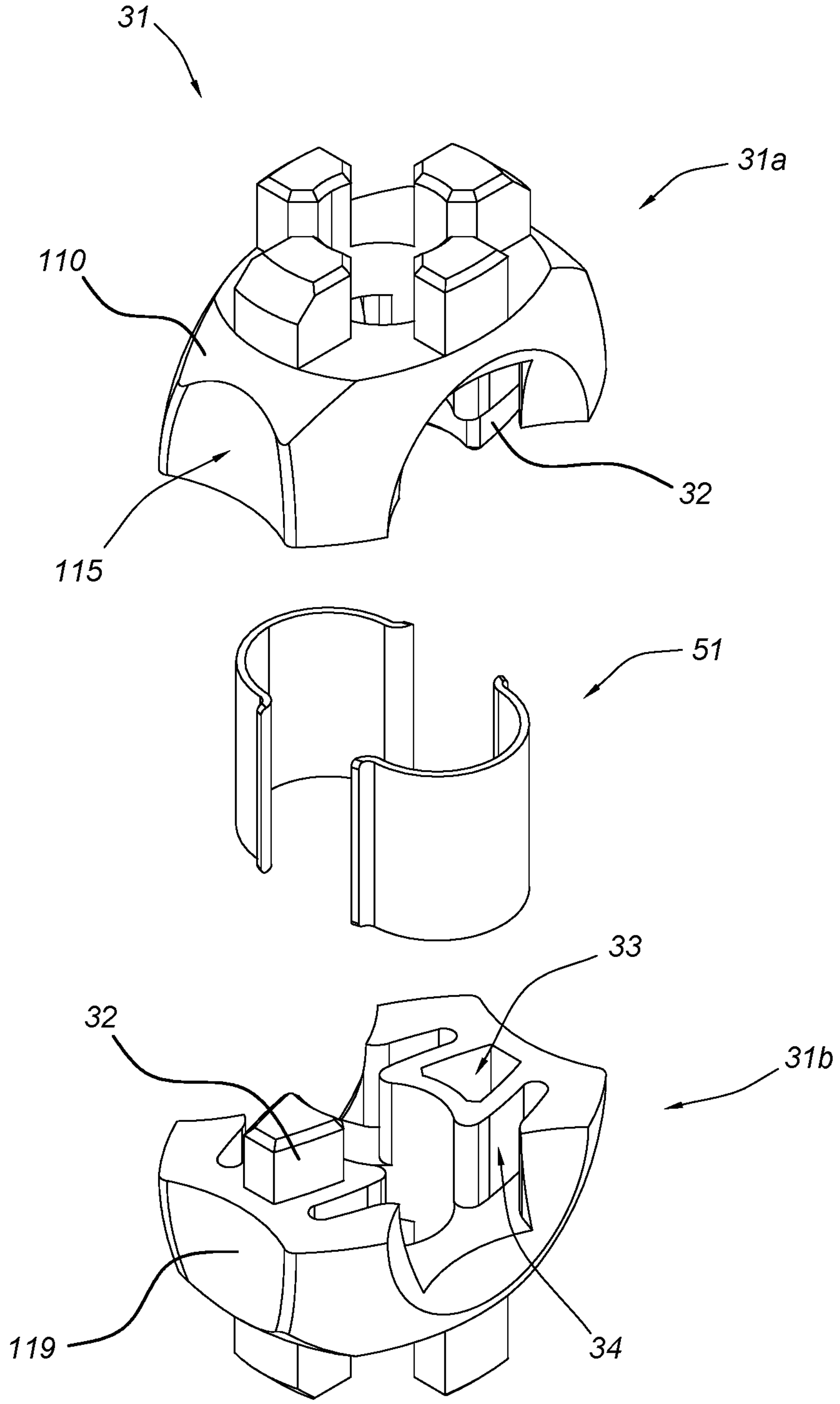
Figure 9A:
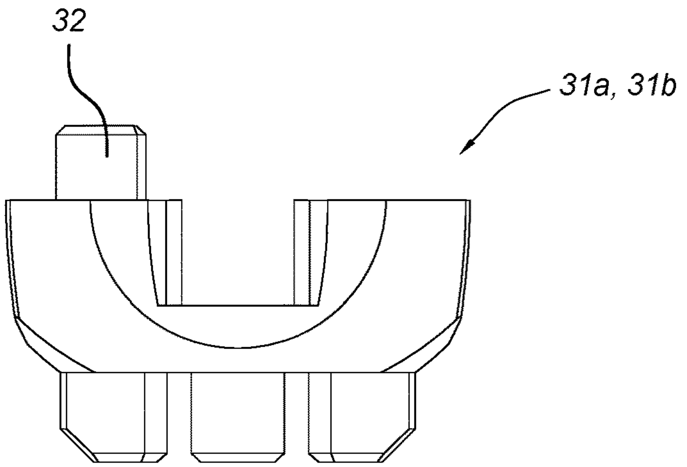
Figure 9B:
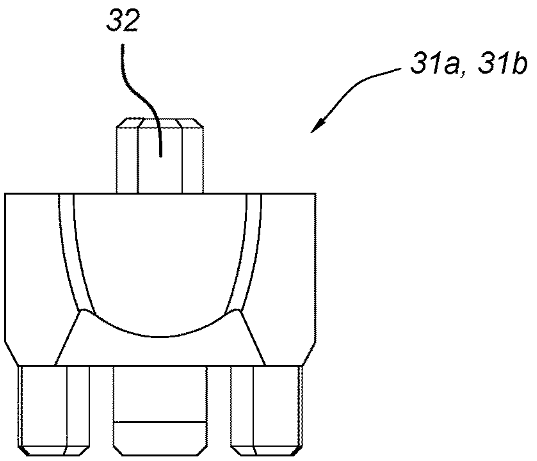
Figure 9C:
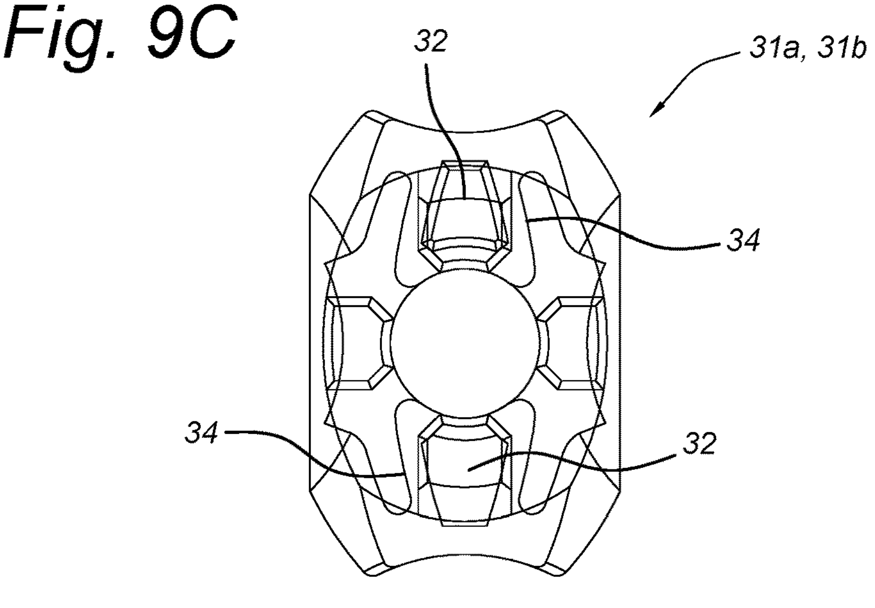

FIGS. 7A-C show an assembly of the cam element and a damping element shown in FIG. 5 according to multiple designs of the current invention;

FIG. 8 shows an open view of an assembly of a cam element according to a second design of the current invention and a damping element according to a fourth design of the current invention; and FIGS. 9A-C show respectively a front view, a side view and a top view of the cam element of a pivot hinge shown in FIG. 8.

Figure 10A:
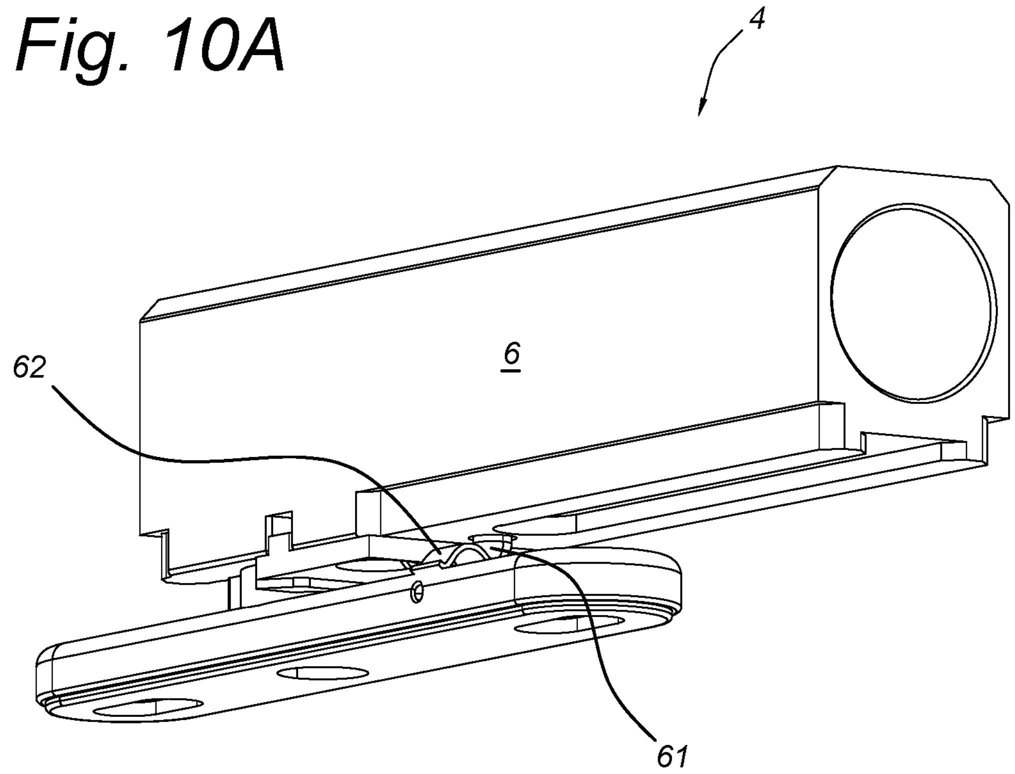
Figure 10B:
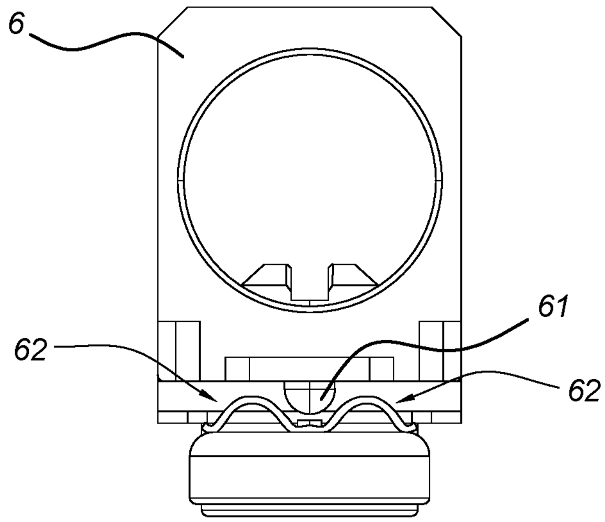

FIGS. 10A-B show respectively an isometric view and an end view of a pivot hinge in accordance with the invention that has additional features to slow the pivot hinge when approaching a closed position.

DETAILED DESCRIPTION OF THE FIGURES

The current invention will hereinafter be described using the well-determined designs and with reference to certain drawings, yet the invention is not limited to these and is only defined by the claims. The drawings shown here are only schematic and non-limiting.

In addition, term" ", "second", "third", and the like are used in the description and in the claims to differentiate between similar elements and not necessarily to indicate a sequential or chronological sequence. The terms in question are mutually exchangeable in the circumstances suitable to them, and the designs of the invention may work in sequences different than those described or illustrated here.

In addition, terms such as "top", "bottom", "above", "under" and like in the description and claims are used for illustrative purposes and not necessarily to indicate relative positions. The thus used terms used are mutually exchangeable in the circumstances suitable to them, and the designs of the invention may work in orientations different than those described here or illustrated here.

The term "comprising" and derivative terms as used in the claims, must or do not have to be interpreted as limiting to the elements that are listed below; the term does not rule out other elements or steps. The term should be interpreted as a specification of the reported characteristics, whole numbers, steps or components that are referred to, without the presence or addition being ruled out of one or more additional characteristics, whole numbers, steps or components or groups of these. The range of an expression such as "a device comprising the elements A and B is thus not only limited to devices that purely consist of components A and B". What is meant, on the other hand, is that regarding the current invention, the only relevant components are A and B.

It must be noted that the current invention is not limited to a door device, but also other rotatable devices, such as a window and a gate, where it can be designed in a similar manner. It must also be noted that the self-closing pivot hinge of a door device according to the current invention is very suitable for use in the other rotating constructions, be it a sliding door installed in a guide profile of a rotating construction or installed in another way in the rotating constructions.

Figure 1:
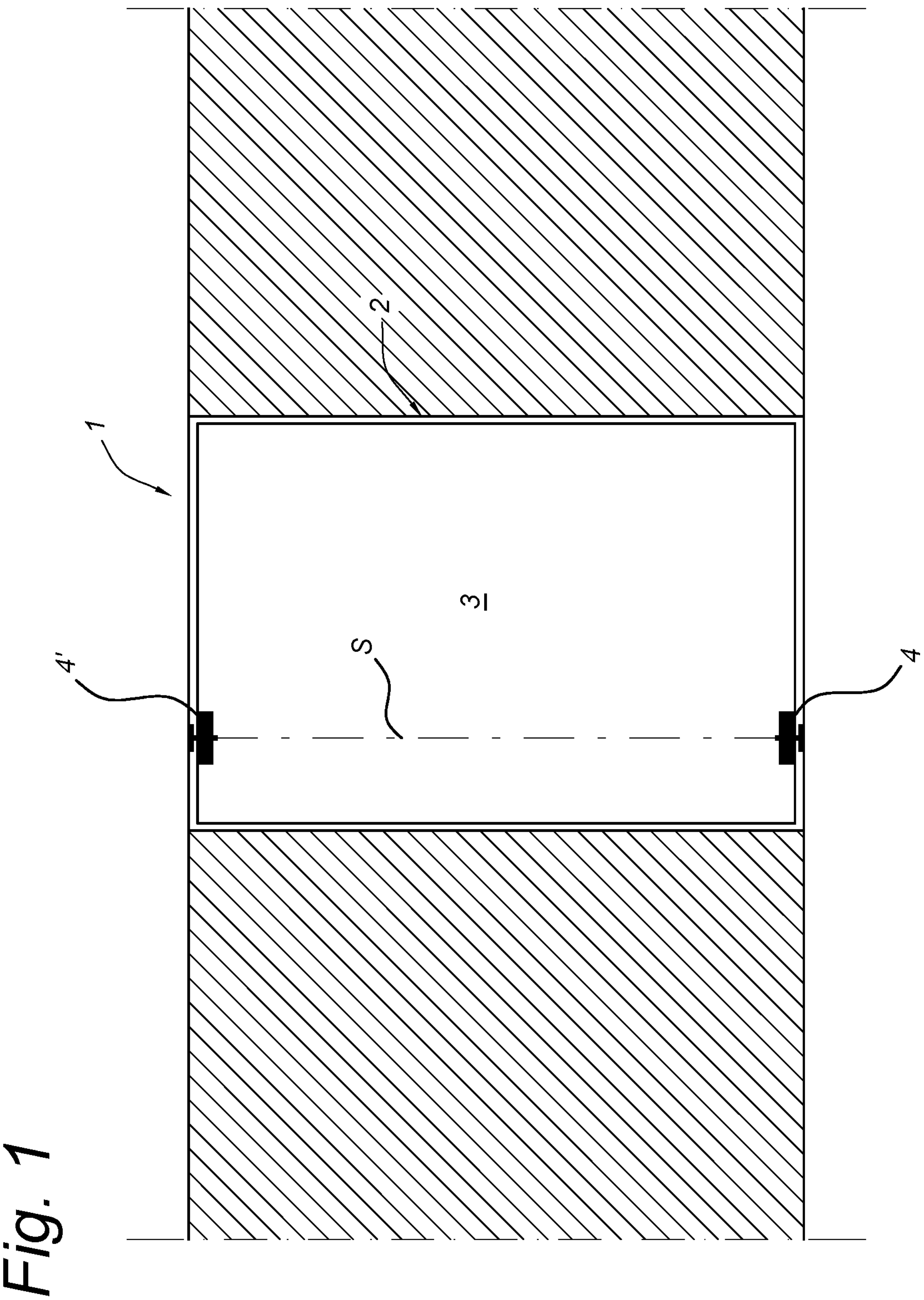
FIG. 1 shows a front view of a simplified representation of a door device according to the current invention.

FIG. 1 shows a front view of a simplified representation of a door device 1 according to one design of the current invention. The door device 1 shown comprises a door leaf 3 that is hung rotatable in a door opening 2 using a first pivot hinge 4 and a second pivot hinge 4'.

The position of the pivot hinges 4, 4' define the position of the rotation axis or pivot axis S, around which the door leaf 1 rotates. In this, the pivot hinges 3 must logically be lined up directly above each other. For a normal door leaf 3 with standard dimensions, the rotation axis is normally chosen so that it lies as close as possible against one of the sides of the door opening 2. In this, the complete width of the door opening 2 can be used for passage. For a wide door leaf 1, it is advantageous to choose the rotation axis at some difference from the side edge of the door opening 2, for example at ⅔ the width of the door leaf 3. Through this, less force must be exerted on the door leaf 3 for opening and closing the door leaf 3. Alternatively, the rotation axis may be in the middle of the door leaf 3, so that forces occurring on opposite sides of the rotation axis override each other. In another version, the rotation axis can be chosen at nearly any position between the sides of the door leaf 3.

In the designs shown of the door device according to the current invention, the door leaf 3 is hung to rotate in the door opening 2 using two identical pivot hinges 4, 4'. In other designs, the door leaf 3 is also hung to rotate in the door opening 2 by using a single pivot hinge 4 according to the invention, and on the other side, a simple pivot hinge or rotation pin can be installed. This simple pivot hinge can for example be a ball or a slider connection between the door leaf and the wall of the door opening 2.

Figure 2:
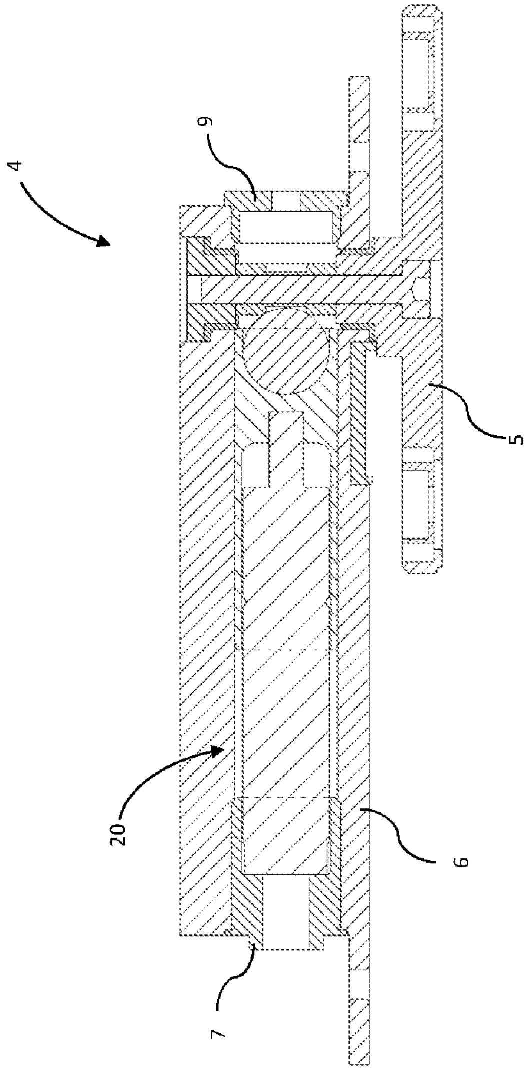
FIG. 2 shows a center cross-section of a pivot hinge of a door device according to a first design of the current invention, wherein the pivot hinge is in a closed position (0°)
Figure 3:
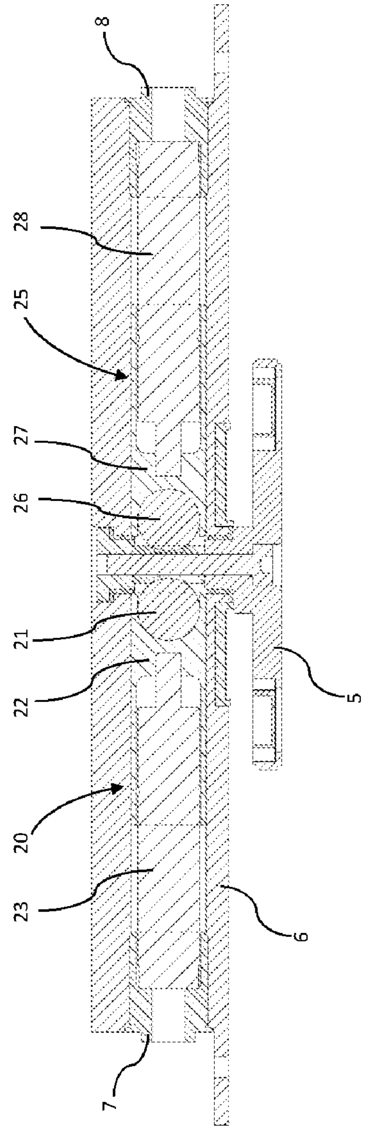
FIG. 3 shows a center cross-section of a pivot hinge of a door device according to a second design of the current invention, wherein the pivot hinge is in a closed position) (0°)

FIGS. 2 and 3 show a pivot hinge 4 according to various designs of the door device according to the current invention. For the most part, both pivot hinges 4 shown are the same shape and assembled in the same way. The pivot hinge 4 shown in FIG. 3 is equipped with a first and second spring device 20, 25 on opposite sides of a rotation column 10 in the housing of the pivot hinge 4.

Figure 4:
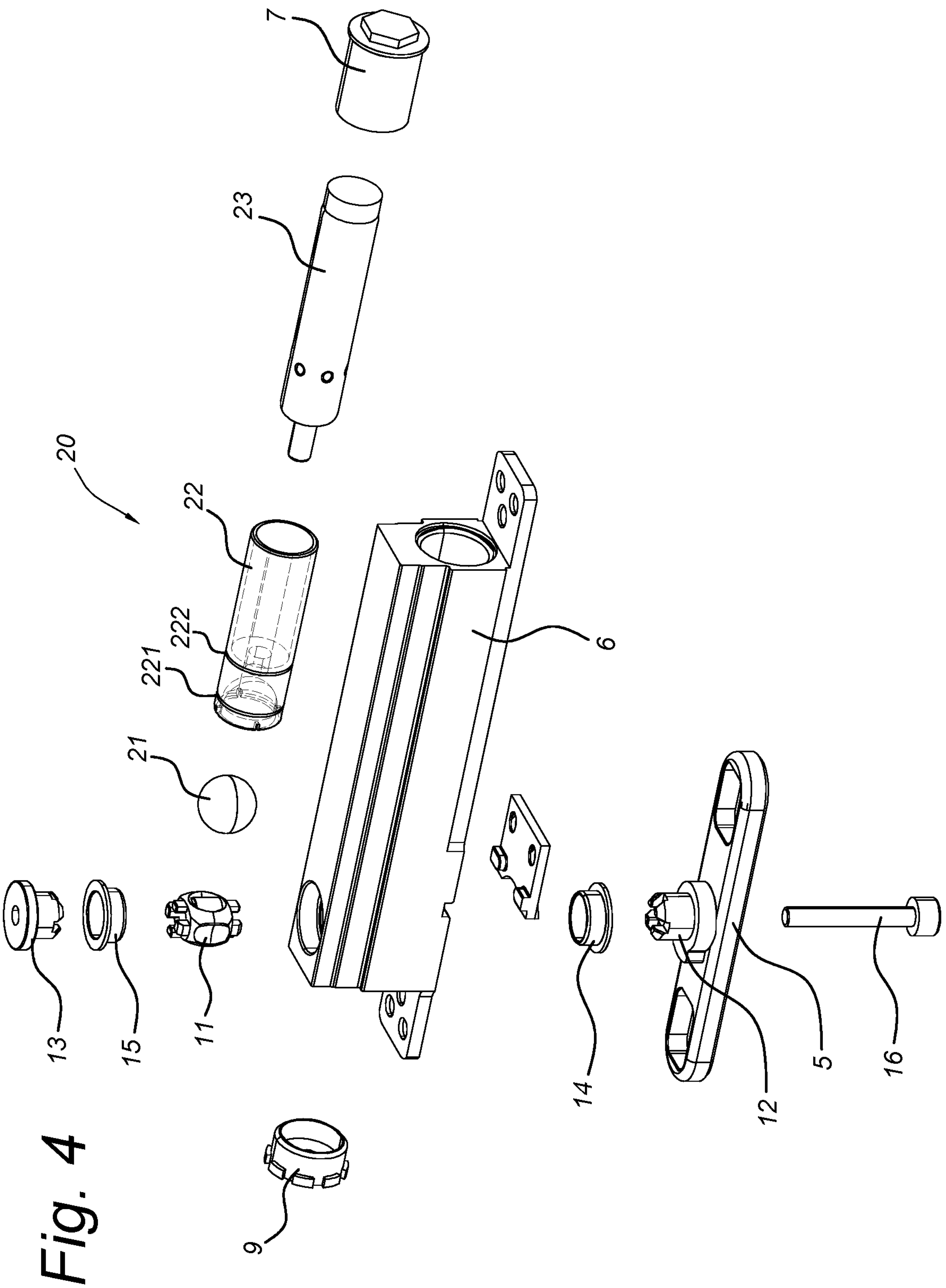
FIG. 4 shows an open view of a pivot hinge of a of a door device according to the first design of the current invention.

FIG. 4 shows an open view of the pivot hinge 4 shown in FIG. 2 according to the current invention. The pivot hinge 4 shown is equipped with a wall fixation unit 5 that can be attached directly to the wall of the door opening 2 using an elongated fixation device, such as screws. The relevant wall fixation unit can be equipped with a damping agent (not shown) to counter the transfer of vibrations of the door leaf 3 and the pivot hinge 4 to the wall of the door opening 2 and vice versa.

The pivot hinge 4 also comprises an elongated housing 6 in which there is an internal hollow space extends between a first and second opening at the ends of the housing 6. In the pivot hinge 4 shown, the opening is closed off by removable closure caps 7, 8, 9. These closure caps allow easy access to the internal parts of the pivot hinge 4.

In the hollow space, there are a number of parts of the pivot hinge 4 at least partially installed, namely the rotation column 10 and one or more spring devices 20, 25 that extend into the elongated housing from the rotation column 10. The rotation column 10 through the housing is attached so that the housing 6 rotates around the rotation column 10.

One or multiple spring devices 20, 25 are inserted on opposite sides of the rotation column 10 in the housing. Each spring device 20, 25 is assembled of a first spherical ball 21 or a second spherical ball 26, and these balls 21, 26 are respectively pressed against the cam element 11 of the rotation column 10 by a first spring 23 and a second spring 28. The first ball 21 and the second ball 26 are provided to roll over a surface from the cam element 11 on rotation of the housing 6 around the rotation column 10 during the opening and closing of the door leaf 3. The cam element 11 is shaped so that the support positions 113, 114, 115, 116 are created in which the first ball 21 and the second balls 26 rest when the door leaf 3 is in the closed position and when the door leaf 3 is in the open position. In other words, the spring devices 20, 25 are in a pre-loaded state in the closed position. This pre-loaded state may be, for example, at least 25%, preferably at least 50% and more preferably at least 75% of the total compressibility of the spring device. In a preferred design, the pre-loading is chosen so that the spring device is always, meaning in every position, is in some way pressed and exerts spring force on the relevant ball.

In the designs shown, the springs 23, 28 are gas springs, but the springs 23, 28 can also be designed in the same way as another spring element such as a cylindrical spring. By using gas springs 23, 28, nearly constant spring force can be applied to the first ball 21 and the second ball 26 and on the cam element 11 in between.

Further, the spring devices also contain pressure elements 22, 27 that are attached between the 23, 28 and the balls 21, 26. The pressure elements 22, 27 shown have a cylindrical shape wherein one end contains a recess with a shape complementary to the shape of the balls 21, 26, wherein the opposite end has a recess with a shape complimentary to the shape of the springs 23, 28. The pressure elements 22, 27 are provided for improving the contact between the springs 23, 28 and the balls 21, 26.

The pressure element 22 shown in FIG. 4 contains O-rings 221, 222 on the outside of the cylindrical pressure element. The o-rings 221, 222 are provided in one or more grooves near the one end with a recess complimentary to the shape of the ball. A first O-ring 221 overlaps in the longitudinal direction of the pressure element 22 with the recess that is complimentary to the shape of the ball and the second O-ring 222 is located mainly between the recesses in the pressure element 22. The O-rings 221, 222 are provided for maintaining the optimal contact between pressure element 22 and the balls 21, 26. This reduces the play between the pressure element 22 and the housing 6, wherein any noise caused by contact between the pressure element 22 and the housing 6 can be reduced.

In the design shown, use is made of two O-rings 221, 222, but it must be clear to the professional that the same effect can also be achieved with one or more ring-shaped elements with a shape complimentary to the shape of the cylindrical pressure element 22, such as an O-ring or non-closed rings.

In addition, the pivot hinge 4 according to the design shown can include a first regulator for regulating the spring pressure of the first spring 23 and a second regulator for regulating the spring pressure of the second spring 28. By using the regulators, the spring pressure of the springs 23, 28 can be finely adjusted.

In addition, the pivot hinges 4, 4' shown are also equipped with blocking agents that prevent the door leaf 3 turning past the open positions in the direction of the closed position. The blocking agents offer the advantage that the door leaf cannot be opened too far, and, for example, hit a wall or objects behind the door leaf when the door is in an open position. The blocking agents thus protect the door leaf from damage and ensure safety in the area of the door leaf. In addition, the blocking agents also have the aesthetic advantage that the use of ugly door stoppers which are normally placed on the floor or on a wall, can be avoided.

FIGS. 5 and 6 show respectively the rotation column 10 and a cam element 11 of the pivot hinges 4 shown in FIGS. 2, 3 and 4 in more detail. The construction of the rotation column 10 according to one design of the door device according to the current invention is explained in more detail below using these figures.

The rotation column 10, shown in detail in FIG. 5, is built up of a cam element 11 that is positioned in the cavity of the housing 6, and held there by two came element holders 12, 13 which are placed openings opposite each other, called rotation column openings, extending through the housing 6. A first of these rotation column openings is located on one side of the housing 6 that is provided to face the door leaf 3 when the pivot hinge 4 is attached to the wall of the door opening, and a second of these rotation column openings is located on one side of the housing 6 that is provided to fact the wall of the door opening 6 when the pivot hinge 4 is attached to the wall of the door opening 2. The cam element holder 23 that is placed in this second rotation column opening, is part of an element for removable attachment of the pivot hinge 4 to the wall of the door opening 2, either directly on the wall using the wall fixation unit 5 as shown in FIG. 1, or via a wall profile on the wall using a wall profile fixation element.

The cam element holders 12, 13 hold the cam element 11 in place using at least one recess provided on each of the cam element holders 23, and using the protruding parts on the cam element 11 and positioned on at least one recess of the cam element holders 12, 13. The protruding parts on the cam element and the recess in each of the cam element holders 12, 13 are shaped such that the cam elements 11 and the cam element holders 12, 13 cannot rotate against each other.

In addition, the cam element holders 12, 13 are still attached to the cam element 11 using screws 16 that are screwed into the openings in the cam element 11 and in the cam element holders 12, 13. In the design shown, use is made of a single screw 16 that runs through the cam element 11 and connects to both cam element holders 12, 13 but one could also use two screws for separate attachment of each of the cam element holders 12, 13 to the cam element 11.

The cam element holders 12, 13 and the rotation column openings are also designed so that the cam element 11 is connected on opposite sides with the cam element holders 12, 13 using the screw provided 16, then the housing 6 is held between the came element holders 12, 13 so that the rotation column 10 can mainly only rotate in relation to the housing 6 and thus cannot slide against the housing 6.

In addition, the rotation column 10 has two slides 14, 15 that are also placed in the rotation column openings in which the cam elements 12, 13 are also placed. These slides 14, 15 are attached between the cam element holders 12, 13 and the housing 6, and reduce the friction between the cam element holders 12, 13 and the housing 6 when the cam element holders 12, 13 rotate in the rotation column openings. This makes the rotation of the housing 6 around the rotation column 10 smoother.

In addition, the cam element 11 is also formed so that the first spring 23 and the second spring 28 are in a compressed position when the first ball 21 and the second ball 26 are in the support positions 115, 116 on the cam element 11 that are consistent with the open position of the door leaf 3, are hereby compressed with regard to the position of the first spring 23 and the second spring 28 when the first ball 21 and the second ball 26 are in the support positions 113, 114 on the cam element 11 that are consistent with the closed position of the door leaf 3. The compressed first spring 23 and the compressed second spring 28 ensure that respectively the first ball 21 and the second ball 26 are pushed to the support positions 113, 114 on the cam element 11 consistent with the closed position of the door leaf 3. In this way, the first spring 23 and second spring 28 has a self-closure function for the pivot hinge 4 according to the designs shown.

The cam element 11 is shown in more detail in FIGS. 6A-C. The cam element 11 according to the design shown in ring-shaped object that has a first surface 111 and second surface 112, and a mantle surface 110 that forms the connection between the first surface 111 and the second surface 112. The housing 6 of the pivot hinge 4 and the door leaf 3 are designed to rotate around a rotation axis through the cam element 11, and the rotation axis is located in the vertical direction through the cam element 11 in the design shown.

The cam element 11 creates support positions 113, 114 in which the first ball 21 and second ball 26 rest when the door leaf 3 is in the closed position. For the first ball 21, the support position 113 is provided in the form of a first recess 113 in the first surface 111 and for the second ball 26, the support position 114 is provided in the form of a second recess 114 in the second surface 112.

The first recess 113 and the second recess 114 are provided on the circumference respectively with a first support surface 117 for the first ball 21 and a second support surface 118 for the second ball 26. The support surfaces 117, 118 ensure good support of the balls 21, 26 in the recesses 113, 114. These support surfaces 117, 118 preferably have a shape that is complementary to the shape of the balls 21, 26, and ensure a more stable positioning of the balls 21, 26 in the recesses 113, 114.

The first recess 113 and the second recess 114 are provided in the cam element 11 shown so that there is a passage through the cam element 11 running from the first surface 111 of the cam element 11 to the second surface 112 of the cam element 11. This allows the first ball 21 and the second ball 26 to entrench as deeply as possible, preferably halfway, into the cam element 11 when the door leaf 3 is in the closed position. This increases the spring path of the first spring 23 and of the second spring 28.

The cam element 11 also creates the support positions 115, 116 in which the first ball 21 and the second ball 26 rest when the door leaf 3 is in the first open position and when the door leaf 3 is in the second open position. These support positions 115, 116 are provided on the cam element 11 in the form of two notches 115, 116 on the mantle surface 110. The two notches 115, 116 are located on two opposite positions on the mantle surface 110 following in a horizontal direction central through the cam element 11 and the mantle surface 110, and the two notches 115, 116 thus lie on opposite sides of the rotation axis mentioned above through the cam element 11. These notches 115, 116 are used by both balls 21, 26. When the door leaf 3 is in the first open position, the first ball 21 rests in one of the two notches 115, while the second ball 26 rests in the first notch 116 that is opposite the first notch 115 in which the first ball 21 rests. When the door leaf 3 is in the second open position, each ball 21, 26 rests in the notch 115, 116 opposite the notch 115, 116 in which each respective ball 21, 26 rests when the door leaf 3 is in the first open position.

At the transition between the mantle surface 110 and the first surface 111 and at the transition between the mantle surface 110 and the second surface 112, there are transition surfaces 119, 120 near the notches 115, 116 on the mantle surface 110. The transition surfaces 22 are provided to ease the transition of the balls 21, 26 from the first surface 111 or the second surface 112 to the mantle surface 110 and of the transition of the balls 21, 26 in the reverse direction. The transition surfaces 119, 120 are preferably convex surfaces.

The cam element 11 also has protruding parts 121, 122 that as listed above are provided to insert into the recess provided on each of the cam element holders 12, 13 that hold the cam element 11 in the rotation column 10. These protruding parts 121, 122 are located on two opposite positions on the mantle surface 110 in the vertical direction central through the cam element 11, thus following the rotation axis through the cam element. In addition, at these positions there are openings 123 provided through the cam element 11. These openings 123 are provided to create a screw connection between the cam element 11 and the cam element holders 12, 13 using a screw 16.

FIG. 6B shows how the first surface 111 and the second surface 112 are formed as a concave surface in the vertical direction of these surfaces 111, 112, thus the direction approximately the same with as the rotation axis through the cam element 11. FIG. 11 shows how the first surface 111 and the second surface 112 are as a concave surface in the horizontal direction of these surfaces 12, 13.

The cam element 11 according to the design shown is also point-symmetrical with regard to a central point of the cam element 11. The cam element 11, rotating at an angle of 180° with regard to this central point brings the cam element 11 back on itself. Thus the cam element 11 rotates such that the first recess 113 in the first surface 111 and the second recess 114 in the second surface 112 are exchanged, without influencing the design and the function of the pivot hinge. The same applies to the notches 115, 116 on the mantle surface 110 and also for the protruding parts 121, 122 on the mantle surface of the cam element 11.

When the door leaf 3 turns in the door opening 2, the pivot hinge 4 functions according to the design shown in FIG. 3 as follows. When the door leaf 3 is in the closed position, the first ball 21 rests in the first recess 113 in the first surface 111 of the cam element 11, and the second ball 26 rests in the second recess 114 in the second surface 112 and the cam element 11. This position is shown in FIG. 3, among others. From the closed position, the door leaf 3 can be turned to a first open position in which the door leaf 3 is rotated over an angle of approximately 90° with regard to the closed position. The door leaf 3 can also be turned to a second open position in which the door leaf 3 is turned at an angle of 90° in the opposite direction.

When turning the door leaf 3 from the closed position to one of the open positions, the housing 6 of the pivot hinge 4 turns around the rotation column 10. The first ball 21 and the second ball 26 thus turn together with the housing 6 around the rotation column 10, and the balls 21, 26 roll over the surface of the cam element 11 as the balls 21, 26 are pressed against the cam element by the springs 23, 28. Thus the first ball 21 rolls from the first recess 113 over the first surface 111 and then over one of the transition surfaces 119, 120 between the first surface 111 and the mantle surface 110 and finally over the mantle surface 110 into one of the notches 115, 116 on the mantle surface 110. Simultaneously, the second ball 16 rolls out of the second recess 114 over the second surface 112, and then over a transition surface 119,120 an the mantle surface to the notch 115, 116 on the mantle surface 110 that is located opposite the notch 115, 116 in the mantle surface 110 to which the first ball rolls 21.

From the open positions, the door leaf 3 can be turned back to the closed position. For this, it is only necessary to apply force to the door leaf 3 which ensures that the balls 21, 26 roll out of the notches 115, 116 on the mantle surface 110 to the transition surfaces 119, 120. From this position, torque is applied to the cam element 11 by the spring 23, 28 via the balls 21, 26, which ensures that the first ball 21 rolls over the first surface 111 into the first recess 113, and that the second ball 26 rolls over the second surface 112 into the second recess 114. In doing so, the springs 23, 28 provide for the self-closing function of the pivot hinge 4.

In the figures listed above, the function of the pivot screws 4, 4' describe that it contains both a first ball 21 that is pressed by the first spring 23 against the cam element 11, and a second ball that is pressed against the cam element 11 by a second spring 28. The pivot hinge 4 can also be made up in a second design according to FIG. 2 without using the second ball 26 and the second spring 28. It must be clear to the professional that this design of pivot hinge 4 will function in the same way as the pivot hinge 4 described above that uses 2 balls 21, 26 and two springs 23, 28.

FIGS. 7A-C, 8 and 9A-C show the structure of a cam element 11, 31*a*, 31*b* and a damping element 41, 41', 41", 51 according to various designs of the pivot hinge 4 according to the present invention.

FIG. 7A shows an open view of a structure of the cam element 11 shown in FIG. 5 with a cylindrical damping element 41 which has a first end 43, a second end 44 and a mantle 45 that forms the connection between the first end and the second end. The opposite ends are formed by convex surfaces 43, 44 that are located in the recesses of the cam element 11 when the damping element 41 is placed in the cam element 11.

The damping element 41 also has a cylindrical opening 46 through the mantle of the damping element 41 to receive the screw 16 when the damping element 41 is placed in the cam element.

The damping element is also point-symmetrical with regard to a central point of the cam element 11. The cam element 41, rotating at an angle of 180° with regard to this central point brings the damping element 41 back on itself. Thus the damping element 41 rotates such that the first end in the first recess 113 and the second end in the second recess 114 are exchanged, without influencing the design and the function of the pivot hinge.

For the most part, the damping elements 41', 41" shown in FIGS. 7B and 7C are shaped the same and made up in the same way as the damping element 41 shown in FIG. 7A.

The damping element shown in FIG. 7A is made of a compressible material, such as a material that can reversibly change in volume by applying force or pressure on the material, and the damping elements 41', 41" are made of an elastically formable material, e.g. a material that can reversibly change shape by applying force or pressure on the material. In addition, the formable damping elements 41', 41" have an elongated opening 47 through the damping elements 41', 41" such that there is a passage provided running from the first end 43 of the damping element 41', 41" to the second end 44 of the damping element 41', 41".

The formable damping element 41" shown in FIG. 7C also has one or more recesses 48 in the first and second end of the damping element. In the design shown, use is made of a slit shaped recess, but this can also be the form known by the professional, such as a cross or hexagonal recess.

Possible elastically formable materials for the damping element 41, 41', 41" are, for example: elastomers, rubbers, flexible elastomeric foams (FEF) or a combination thereof.

For the largest part, the cam element 31 shown in FIG. 8, FIGS. 9A-C is shaped in the same way and constructed in the same way as the cam element 11 shown in FIG. 5. The cam elements shown vary in the way they are constructed. The cam element 31 shown in FIG. 8 is constructed of two identical cam parts 31*a*, 31*b* with snap-lock unit consisting of a protruding snap profile 32 and a complimentary recess 33 for connecting the cam elements 31*a*, 31*b* to each other.

Each cam part 31*a*, 31*b* also has curved recesses 34 on opposite sides of the snap-lock unit 32, 33 for receiving a spring spring-shaped damping element 51, more specifically a semi-circular curved leaf spring element as shown in the figure.

In FIGS. 10A and 10B, the pivot hinges 4 shown also have additional braking and outline media 61, 62, 62' that slow the pivot hinges 4 toward the closed position. The media contain a pin 61 and two protrusions 61, 62'. The pin 61 is attached in an opening provided in the housing 6 on the side of the housing 7 that is provided to face the wall of the door opening 2 when the pivot hinge 4 is attached to the wall of the door opening 2. In the pivot hinge 4 shown, the two protrusions 62, 62' are provided on the wall fixation unit 5. The protrusions 62, 62' are oriented in a direction approximately vertical in the longitudinal direction of the housing 6, when the door leaf 1 is in the closed position. When turning the pivot hinges 4 from the open position to the closed position, the pin 61 will then come into contact with one of the protrusions 61, 61' and bump against it, and will decelerate the closure movement. The pin 61 also secures the 0° position if it is located centrally between the curved spring-loaded surfaces 62, 62'.

In the designs shown, the pen 61 is attached on the side of the housing 6 and the two protrusions 62, 62' on the wall fixation unit 5 but it must be clear to the professional that the same effect can also be achieved by attaching the pen 61 to the wall fixation unit and the two protrusions 62, 62' on the relevant side of the housing 6. The components of the door device according to the current invention chosen from the group consisting of the cam element 11, the wall fixation unit 5, the removable closure cap 7, 8, 9 of the housing 6 and the spring shaped damping element 51 are preferably made of steel due to the strength, and even more preferably of rust-proof or stainless steel (SS) due to the corrosion resistance. An example of rust-proof steel that can be used is ANSI 304 stainless steel.

The components in the group listed above that are exposed to great forces during the use of the door device, such as the cam element 11, the cam element holders 12, 13 and the screw 16 for the connection of the cam element holders 12, 13 and the cam element 11 are even more preferably made of a duplex rust-proof or stainless steel (duplex steel) due to the greater strength and stability and also due to the even better corrosion resistance. Duplex steel is indeed a tough alloy displays few deformities when exposed to great force. An example of a duplex steel that can be used is CD4MCu duplex stainless steel. The first ball 21 and the second ball 26 are preferably made of a tempered and stainless steel to limit wear and deformation of the balls 21, 26 as the result of the forces and friction to which they are exposed. An example of a metal alloy that can be used for the balls 21, 26 is ISO3290 chromium steel, which is a metal alloy that is very suitable for use in ball balls due to the hardness and resistance to deformation.

In one design of the door device according to the current invention, use is made of balls 21, 26 with a diameter of approximately 15 mm.

Preferably one uses springs 23, 28 that can exert force of at least 200 N, preferably at least 250 N and even more preferably at least 300 N. This allows for the door leaves 1 to supply open at a weight of approximately 150 kg to dimensions of approximately 2 m to 2.5 m. It must be clear to the professional that for smaller standard double door leaves 1 one can also use springs of a lesser strength 23, 28.

The housing 6 of the pivot hinge 4 preferably contains aluminium, and even more preferably anodized aluminium. The use of aluminium is advantageous because this material has a low weight combined with great strength, and due to the corrosion resistance. In addition, aluminium is easy to extrude in the desired shape, such as the shape of the housing 6 of the pivot hinge 4. The use of anodized aluminium is also advantageous because the surface of the aluminium is coated with an extra wear-resistant and corrosion resistant layer. The additional wear-resistance of anodized aluminium is, for example, advantageous in limiting wear that is attributed to the movement of the balls 21, 26 and the springs 23, 28 in the housing. An example of an aluminium alloy that can be used is AIMgSi 0.5.

The pressure elements 22, 27 and the O-rings 221, 222 are preferably made of plastic, and even more preferably polyoxymethylene (POM). The use of POM is preferred due to its high toughness, low friction coefficient and outstanding shape retention. Furthermore, POM also has the advantage that it is not affected by lubricants.

The slides 14, 15 of the rotation column 10 are preferably made of a plastic. An example of a plastic that could be used is Iglidus® G from Igus® GmbH. This is a plastic with a low friction coefficient which can resist a high load and not be affected by lubricants.

The gas springs 23, 28 are preferably reducing gas springs 23, 28 equipped with a flap or valve that can be opened to release a gas located in the gas spring 23, 28 for building up spring pressure from the gas spring 23, 28 to reduce the spring force or spring pressure. This allows the gas springs 23, 28 to be able to provide their maximum spring force to then be adjusted to a desired spring force when mounted in a door device according to one design of the current invention. In this way, one type of the self-closing pivot hinge can be used in an advantageous manner for various applications that require varied spring force of the first spring 23' and the second spring 28' in the self-closing pivot hinge 4. Preferably, the gas springs 23, 28 are equipped such that they can provide a maximum spring force of approximately 700 N, and that they can be adjusted to provide a minimum spring force of 50° N.

Preferably, the reducible gas springs 23, 28 are equipped such a that when a valve or flap opens, a previously determined amount of gas escapes from the spring, after which the valve or flap closes automatically. This allows for the spring pressure or spring force to be reduced step by step at intervals of a previously determined size, that makes a fine adjustment of the spring force possible and prevents too much gas being released from the gas spring 23, 28.

Preferably the gas springs 23, 28 are equipped with a hydraulic damper, such as using oil that is located in the gas spring 23, 28 is located in addition to the gas provided to create the spring pressure of the gas spring 23, 28. The hydraulic damping ensures that the gas spring 23, 28 can be slowed at the end of the incoming or outgoing movement. This may be used at an advantage for having the self-closing hinge 4 decelerate a door leaf 3 moving into the closed position in a door opening 2 to prevent fluctuations or oscillations of the door leaf 3.

LIST WITH REFERENCE NUMBERS

1. Door device
2. Door opening
3. Door leaf
4, 4'. Pivot hinge
5. Wall fixation section
6. Housing of the Pivot Hinge
7, 8, 9. Closure cap
10. Rotation column
11. Cam element
12, 13. Cam element holder
14, 15. Slider
16. Screw
20, 25. Spring system
21, 26. Ball
22, 27. Pressure element
23, 28. Gas spring
31. Cam element
32. Snap-lock profile
33. Recess of the Snap-lock fixation means
34. Arched Recesses
41, 41', 41". Damping elements
43, 44. Convex surface
45. Mantle of the damping element
46. Cylindrical opening
47. Elongated opening
48. Recesses in the damping element
51. Spring-shaped damping element
61. Pin
62, 62'. Protrusions
110. Mantle surface
111, 112. First and second surfaces
113, 114. Recess
115, 116. Grooves
117, 118. Support surface
119, 120. Transition surface
121, 122. Protrusions from the cam element
221, 222 O-rings of the pressure element

The invention claimed is:

1. Device for closing an opening between two rooms or a façade opening of a building, the device comprising:
- a plate shaped element; and
- a first and a second pivot hinge provided on opposite sides of the plate shaped element for rotational hanging of the plate shaped element in the opening around a hinge axis, said first pivot hinge comprising:
- a hinge housing;
- a rotation column provided to be attached to a wall of the opening opposite a relevant side of the plate shaped element, wherein the housing is attached to rotate around the rotation column such that the housing is rotatable around the rotation column from a closed position, in which the plate shaped element closes the opening, in a first direction to a first open position and/or in a second direction, opposite to the first direction, to a second open position;

a spring that extends into the hinge housing along the longitudinal direction of the hinge housing and which lends a self-closing function to the first pivot hinge; and a cam element that is part of the rotation column, and a ball that is pressed against the cam element by the spring, and wherein the cam element is shaped so that it creates support positions in which the ball rests when the plate shaped element is in the open and closed positions, and that the ball is pushed by spring force of the spring nearly from each position different from the support positions towards one of the support positions that corresponds with the closed position of the plate shaped element, wherein the support positions are formed by recesses in opposite surfaces of the cam element, wherein a damping element is included in the recess of the cam element that corresponds with the closed position of the plate shaped element so that, when the ball is pushed by the spring force into the recess that corresponds with the closed position of the plate shaped element, the damping element is deformed by the ball and the ball is slowed, wherein the damping element defines an elongated opening through the cam element to receive an elongated connection means for connecting the elements of the rotation column to each other.

2. Device according to claim 1, wherein the first pivot hinge is integrated in a top or bottom side of the plate shaped element.

3. Device according to claim 1, wherein the damping element is made of a solid material.

4. Device according to claim 1, wherein the damping element comprises a convex surface that is located in the recess of the cam element.

5. Device according to any claim 1, wherein the damping element is made of an elastically deformable material, selected from the group consisting of elastomer, rubber, flexible elastomeric foams, FEF, or a combination thereof.

6. Device according to claim 5, wherein the elastically deformable damping element in an undeformed state comprises at least one recess for receiving part of the elastic deformable damping element during deformation of the elastically deformable damping element.

7. Device according to claim 6, wherein the elastically deformable damping element comprises a second elongated opening through the damping element.

8. Device according to claim 1, wherein the damping element is formed by a spring-shaped damping element.

9. Device according to claim 1, wherein the cam element is constructed of two identical cam parts with snap-lock means consisting of a protruding snap profile and a complimentary recess for connecting the cam elements to each other.

10. Device according to claim 1, wherein the damping element is formed by a spring-shaped damping element, wherein the cam element is constructed of two identical cam parts with snap-lock means consisting of a protruding snap profile and a complimentary recess for connecting the cam elements to each other, and wherein the cam element comprises curved recesses on opposite sides of the snap-lock means for receiving the spring-shaped damping element.

11. Device according to claim 1, wherein the spring is in a pre-loaded state when the plate shaped element is in the closed position, wherein the pre-loading is at least 25% of the total compressibility of the spring device.

12. Device according to claim 1, wherein the spring is in a pre-loaded state when the plate shaped element is in the closed position, wherein the pre-loading is at least 50% of the total compressibility of the spring device.

13. Device according to claim 1, wherein the spring is in a pre-loaded state when the plate shaped element is in the closed position, wherein the pre-loading is at least 75% of the total compressibility of the spring device.

14. Device according to claim 1, wherein the spring is a first spring and the ball is a first ball, and wherein the first pivot hinge further comprises:

a second spring that extends into the housing in the longitudinal direction of the housing and wherein the first and second springs are located on opposite sides of the rotation column; and a second ball that is pressed against the cam element by the second spring, and wherein the cam element is shaped so that it creates further support positions in which the second ball rests when the plate shaped element is in the open and closed positions, and that the second ball is pushed by spring force of the second spring nearly from each position different from the further support positions towards one of the further support positions that corresponds with the closed position of the plate shaped element.

15. Pivot hinge, for use with a plate shaped element of a device for closing an opening between two rooms or a façade opening of a building, wherein the pivot hinge is for rotational hanging of the plate shaped element in the opening around a hinge axis, wherein the pivot hinge comprises:

a hinge housing;

a rotation column provided to be attached to a wall of the opening opposite a relevant side of the plate shaped element, wherein the housing is attached to rotate around the rotation column such that the housing is rotatable around the rotation column from a closed position, in which the plate shaped element closes the opening, in a first direction to a first open position and/or in a second direction opposite to the first direction, to a second open position;

a spring that extends into the hinge housing along the longitudinal direction of the hinge housing and which lends a self-closing function to the pivot hinge; and a cam element that is part of the rotation column, and a ball that is pressed against the cam element by the spring, and wherein the cam element is shaped so that it creates support positions in which the ball rests when the plate shaped element is in the open and closed positions, and that the ball is pushed by spring force of the spring nearly from each position different from the support positions towards one of the support position that corresponds with the closed position of the plate shaped element, wherein the support positions are formed by recesses in opposite surfaces of the cam element, wherein, a damping element is included in the recess of the cam element that corresponds with the closed position of the plate shaped element so that, when the ball is pushed by the spring force into the recess that corresponds with the closed position of the plate shaped element, the damping element is deformed by the ball and the ball is slowed.

16. Door device comprising a pivot hinge according to claim 15, wherein the plate shaped element is a door leaf.

17. Door device according to claim 16, wherein the width of the door leaf is at least 100 cm.

18. Door device according to claim 16, wherein the weight of the door leaf is between 50-200 kg.

19. Door device according to claim 16, wherein the weight of the door leaf is between 100-150 kg.

20. The building comprising at least one door device according to claim 16.

* * * * *